US008483662B2

(12) United States Patent
Kato (10) Patent No.: US 8,483,662 B2
(45) Date of Patent: Jul. 9, 2013

(54) MOBILE COMMUNICATION SYSTEM, MOBILE STATION APPARATUS, BASE STATION APPARATUS, COMMUNICATION CONTROL METHOD, AND STORAGE MEDIUM STORING PROGRAM

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 13/139,788

(22) PCT Filed: Dec. 18, 2009

(86) PCT No.: PCT/JP2009/007028
§ 371 (c)(1), (2), (4) Date: Jun. 15, 2011

(87) PCT Pub. No.: WO2010/082276
PCT Pub. Date: Jul. 22, 2010

(65) Prior Publication Data
US 2011/0263226 A1   Oct. 27, 2011

(30) Foreign Application Priority Data

Jan. 15, 2009   (JP) ................................. 2009-006247

(51) Int. Cl.
*H04W 88/02* (2009.01)
(52) U.S. Cl.
USPC ......................................... 455/411; 455/450
(58) Field of Classification Search
USPC ............ 455/411, 450; 370/328, 330; 701/408
See application file for complete search history.

(56) References Cited

U.S. PATENT DOCUMENTS

| 2011/0273287 A1* | 11/2011 | LaLonde et al. ......... 340/539.12 |
| 2012/0206334 A1* | 8/2012 | Osterhout et al. ............ 345/156 |
| 2012/0212484 A1* | 8/2012 | Haddick et al. ............... 345/419 |
| 2012/0214443 A1* | 8/2012 | Daigle .......................... 455/411 |

FOREIGN PATENT DOCUMENTS

| JP | 10-94037 A | 4/1998 |
| JP | 2000224660 A | 8/2000 |
| JP | 2004104731 A | 4/2004 |
| JP | 2005079845 A | 3/2005 |
| JP | 2007096746 A | 4/2007 |
| JP | 2007134797 A | 5/2007 |

OTHER PUBLICATIONS

International Search Report for PCT/JP2009/007028 mailed Jan. 26, 2010.

* cited by examiner

*Primary Examiner* — Diane Mizrahi (57) ABSTRACT

A mobile communication system including a base station apparatus and a mobile station apparatus. The base station includes a holding unit and a base station controller. The mobile station apparatus includes a mobile station controller for transmitting and receiving user information to and from the base station apparatus and managing the user information acquired from the base station apparatus, in which the mobile station apparatus does not hold the user information of the mobile station apparatus in advance, but acquires the user information, after a power supply of the mobile station apparatus is turned on, from the base station apparatus through the mobile station controller and temporarily stores the user information.

13 Claims, 9 Drawing Sheets

MOBILE COMMUNICATION SYSTEM, MOBILE STATION APPARATUS, BASE STATION APPARATUS, COMMUNICATION CONTROL METHOD, AND STORAGE MEDIUM STORING PROGRAM

This application is the National Phase of PCT/JP2009/007028, filed Dec. 18, 2009, which claims the benefit of priority, and incorporates herein by reference in its entirety, the following Japanese Patent Application No. 2009-006247 filed on Jan. 15, 2009.

TECHNICAL FIELD

The present invention relates to a mobile communication system, a mobile station apparatus, a base station apparatus, a communication control method, and a storage medium storing a program, and more particularly, to a technique preferably applied to the mobile communication system that aims to enhance security.

BACKGROUND ART

Operations of Attach/Detach in a mobile communication system will be described with reference to FIG. 8. Further, operations in the case of an outgoing call/an incoming call in the mobile communication system will be described with reference to FIG. 9. Attach is the processing to register the location of a mobile station apparatus such as a portable telephone or the like to a network. Typically, Attach is executed when a power supply of the mobile station apparatus is turned on or when the mobile station apparatus moves between cells. Detach is the processing to cancel the location registration of the mobile station apparatus to the network. Typically, Detach is executed when a power supply of the mobile station apparatus is turned off.

Figure 8:
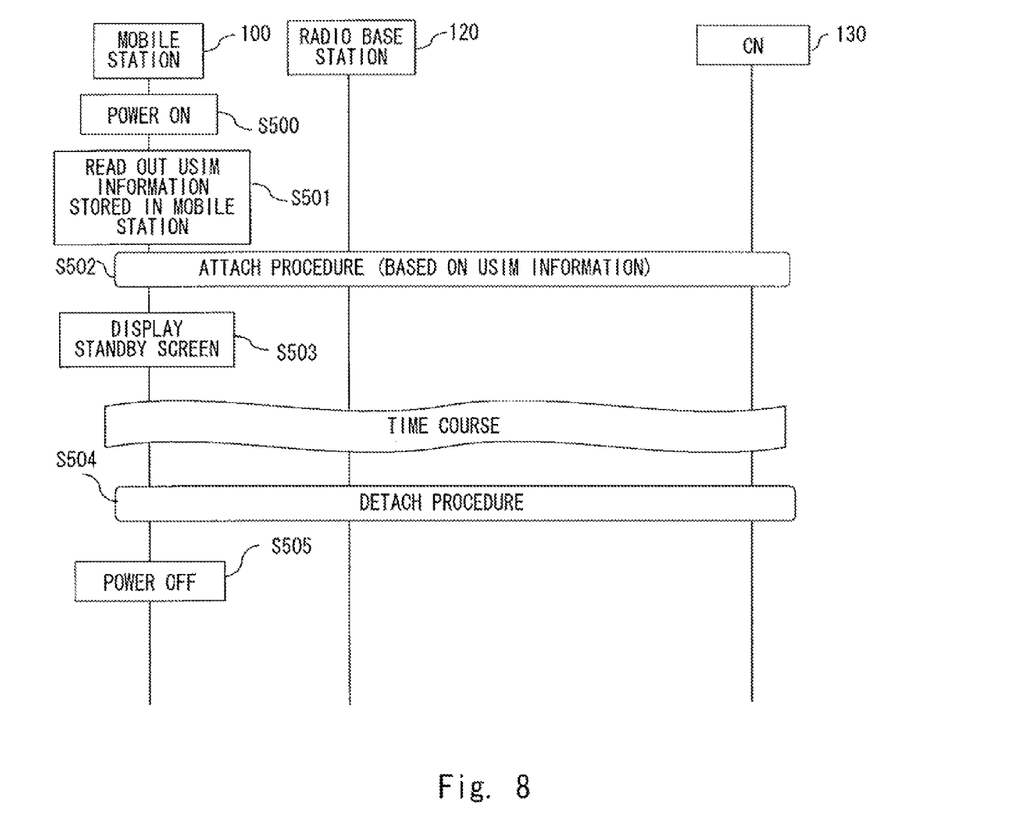
FIG. 8 is a sequence chart showing an operation of each apparatus (when Attach and Detach are executed) in a typical mobile communication system.

In FIG. 8, after Power ON (S500), a mobile station 100 reads out USIM (Universal Subscriber Identity Module) information stored in the mobile station 100 (S501). Then, the mobile station 100 executes Attach procedure based on the USIM information among the mobile station 100, a radio base station 120, and a CN (core network) 130 (S502). Then, the mobile station 100 displays a standby screen (S503). After a predetermined period of time, the mobile station 100 executes Detach procedure among the mobile station 100, the radio base station 120, and the CN 130 (S504). However, at this time, the mobile station 100 does not delete the USIM information.

Figure 9:
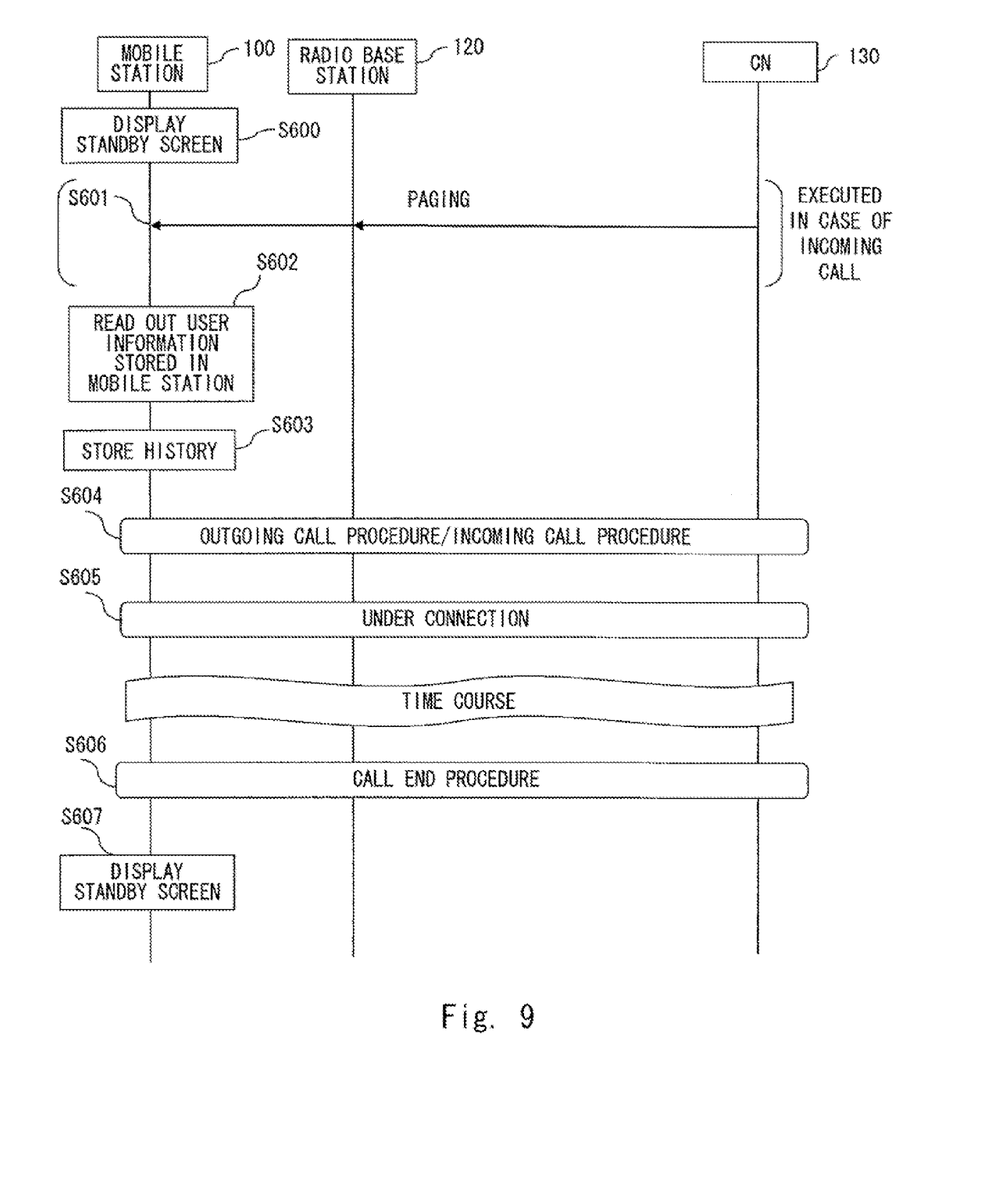
FIG. 9 is a sequence chart showing an operation of each apparatus (when an outgoing call or an incoming call is executed) in a typical mobile communication system.

Further, in FIG. 9, when the mobile station 100 performs an outgoing call or an incoming call (S601) from the state in which the standby screen is displayed (S600), the mobile station 100 reads out user information stored therein (S602). The mobile station 100 then stores the history in the mobile 100 station (S603). Then, the mobile station 100 executes the procedure of the outgoing call or the incoming call (S604), to connect with the radio base station 120 and the CN 130 (S605). After executing the call end procedure (S606), the mobile station 100 displays the standby screen without deleting the user information (S607).

According to the mobile communication system stated above, when the user loses the mobile station apparatus and the mobile station apparatus is passed into the hands of a third party, the user information that remains inside the mobile station apparatus may be known to the third party. In order to address this problem, Patent literature 1 suggests, for example, a mobile radio telephone system that remotely deletes user information of a mobile station in the range of radio communication when the user finds that the mobile station apparatus is lost. In the mobile radio telephone system disclosed in Patent literature 1, when the base station checks the location registration of the mobile station, the base station sends a user information transmission signal to the mobile station, and the mobile station that receives the signal deletes the user information stored therein after transmitting this information to the base station.

CITATION LIST

Patent Literature

Japanese Unexamined Patent Application Publication No. 2000-224660

SUMMARY OF INVENTION

Technical Problem

The general mobile communication system described above and the mobile radio telephone system disclosed in Patent literature 1 have the following problems. The first problem is that, since the user information including telephone book information and USIM information is stored in the mobile station, it is highly possible that the user information is lost or leaked to a third party in the event that the mobile station is lost or stolen (problem of a general mobile communication system). The second problem is that, when the mobile station that is lost or stolen and stores the user information is not in the range of radio communication, it is highly possible that the user information cannot be remotely deleted and is leaked to the third party (this problem is hard to be solved even by the mobile radio telephone system disclosed in Patent literature 1).

As stated above, the current mobile communication system such as a third generation system, for example, achieves a method of remotely deleting the user information in the mobile station and a method of locking the operation of the mobile station while holding the user information in the mobile station. However, since this system does not work outside the range of radio communication, there is still a risk of the user information being leaked when the mobile station is lost or stolen.

The present invention aims to minimize the risk of user information being leaked to a third party in the event that a mobile station apparatus is lost or stolen.

Solution to Problem

In order to achieve such an object, a mobile communication system according to the present invention includes a base station apparatus including: a holding means for holding user information including subscriber information used for location registration processing of a mobile station apparatus connected by radio, access information used for an access to another mobile station apparatus or to a network, and history information indicating history of the access; and a base station control means for transmitting and receiving the user information to and from the mobile station apparatus and managing the user information held in the holding means; and a mobile station apparatus that includes a mobile station control means for transmitting and receiving the user information to and from the base station apparatus and managing the user information acquired from the base station apparatus, in which the mobile station apparatus does not hold the user information of the mobile station apparatus in advance, but acquires the user information, after a power supply of the mobile station apparatus is turned on, from the base station apparatus through the mobile station control means and temporarily stores the user information.

Further, a mobile station apparatus according to the present invention includes a mobile station control means for transmitting and receiving user information to and from a base station apparatus and managing the user information acquired from the base station apparatus, the base station apparatus including a holding means and a base station control means, the holding means holding the user information including subscriber information used for location registration processing, access information used for an access to another apparatus or a network, and history information indicating history of the access, the base station control means transmitting and receiving the user information and managing the user information that is held in the holding means, in which the mobile station apparatus does not hold the user information of itself but acquires the user information, after a power supply is turned on, from the base station apparatus through the mobile station control means and temporarily stores the user information.

Further, a base station apparatus according to the present invention includes a holding means for holding user information including subscriber information used for location registration processing of a mobile station apparatus connected by radio, access information used for an access to another mobile station apparatus or to a network, and history information indicating history of the access; and a base station control means for transmitting and receiving the user information to and from the base station apparatus, transmitting and receiving the user information to and from the mobile station apparatus that manages the user information acquired from the base station apparatus, and managing the user information held in the holding means, in which the base station control means transmits the user information to the mobile station apparatus after a power supply of the mobile station apparatus that does not hold the user information in advance is turned on.

Furthermore, a communication control method according to the present invention includes sending a request to acquire user information to a base station apparatus including a holding means for holding the user information, after a power supply of a mobile station apparatus is turned on, in the mobile station apparatus that does not hold the user information in advance, the user information including subscriber information used for location registration processing of itself, access information used to access another apparatus or a network, and history information indicating history of the access, transmitting the user information to the mobile station apparatus according to the acquisition request in the base station apparatus; and acquiring the user information from the base station apparatus in the mobile station apparatus to temporarily store the user information.

Moreover, a storage medium storing a program according to the present invention causes a computer of a base station apparatus including a holding means for holding user information to execute the following processing of: receiving a request to acquire the user information from a mobile station apparatus connected by radio, the user information including subscriber information used for location registration processing of the mobile station apparatus, access information used for an access to another mobile station apparatus or to a network, and history information indicating history of the access; and transmitting the user information to the mobile station apparatus according to the acquisition request.

Moreover, a storage medium storing a program according to the present invention causes a computer of a mobile station apparatus that connects with a base station apparatus by radio and that does not hold user information in advance to perform processing of: sending a request to acquire the user information, after a power supply is turned on, to the base station apparatus that includes a holding means holding user information including subscriber information used for location registration processing, access information used for an access to another apparatus or to a network, and history information indicating history of the access; and temporarily storing the user information acquired from the base station apparatus.

Advantageous Effects of Invention

According to the present invention, the user information is not held in the mobile station apparatus, but held in the mobile communications infrastructure (base station apparatus or the like). When the user information is needed (when Attach processing or an outgoing call is performed), the user information is temporarily transmitted from the mobile communications infrastructure to the mobile station apparatus, and the operation history is transmitted from the mobile station apparatus to the mobile communications infrastructure. When the user information becomes unnecessary in the mobile station apparatus (after Detach processing or after a telephone call is ended), the user information in the mobile station apparatus is deleted. Accordingly, it is possible to minimize the risk of the user information being leaked to a third party in the event that the mobile station apparatus is lost or stolen.

DESCRIPTION OF EMBODIMENTS

The present invention characterizes in that user information is not held in a mobile station apparatus, but is held in a mobile communications infrastructure (base station apparatus or the like), and the user information is transmitted to the mobile station apparatus as required. More specifically, a specific first characteristic of the present invention is that the user information (USIM information, telephone book information, outgoing/incoming call history, transmitted/received mail, Bookmark or the like) held in the mobile station apparatus in an existing mobile communication system is not held in the mobile station apparatus, but is held in the mobile communications infrastructure. Further, a specific second characteristic of the present invention is that, when the user information is needed (when Attach processing or an outgoing call is executed), the user information is temporarily transmitted from the mobile communications infrastructure to the mobile station apparatus, and the operation history is transmitted from the mobile station apparatus to the mobile communications infrastructure. Furthermore, a specific third characteristic of the present invention is that the user information in the mobile station apparatus is deleted when the user information becomes unnecessary in the mobile station apparatus (after Detach processing, after telephone call is ended or the like).

Figure 1:
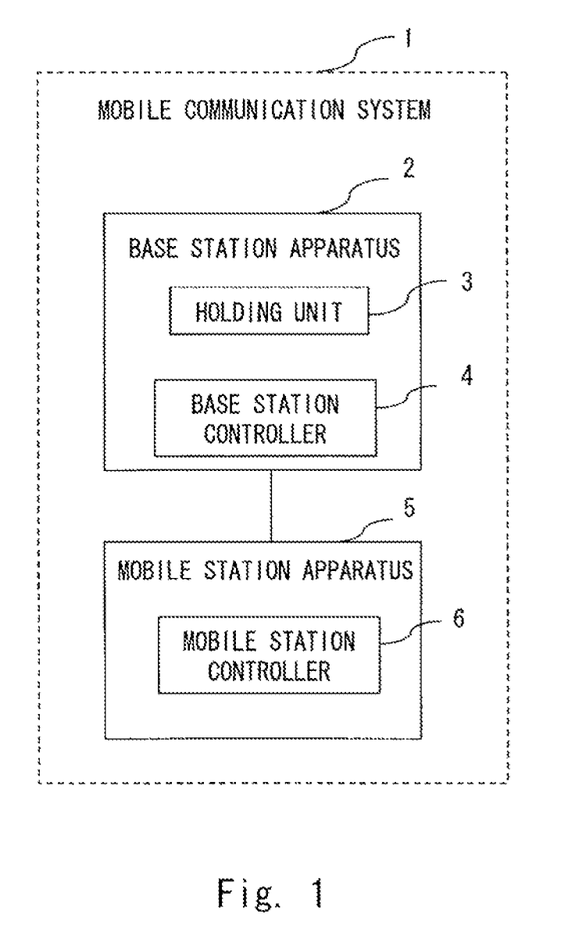
FIG. 1 is a diagram showing a configuration of a mobile communication system to which the present invention is applied.

FIG. 1 is a diagram showing a configuration of a mobile communication system 1 to which the present invention is applied. The mobile communication system 1 includes a base station apparatus 2 including a holding unit 3 and a base station controller 4, and a mobile station apparatus 5 that is connected to the base station apparatus 2 by radio and that includes a mobile station controller 6. In the base station apparatus 2, the holding unit 3 holds user information including subscriber information used for processing to register the location of the mobile station apparatus 5, access information used for an access, and history information of the access. Note that the subscriber information is, for the mobile station apparatus 5, the information used for processing of registering the location of itself. Further, the base station controller 4 performs transmission and reception of the user information according to a request sent from the mobile station apparatus 5, and manages data in the holding unit 3. On the other hand, in the mobile station apparatus 5, the mobile station controller 6 performs transmission and reception of the user information to and from the base station apparatus 2, and manages the user information that is acquired. Further, the mobile station apparatus 5 does not hold the user information in advance. After a power supply is turned on, when the mobile station apparatus 5 needs the user information in such cases as a case in which it executes Attach, a case in which it refers to a phone book to perform an outgoing call, or a case in which it refers to Bookmark to perform a web connection, the mobile station controller 6 acquires the user information from the base station apparatus 2 to temporarily hold the user information, and deletes the user information that is temporarily held before the power supply is turned off (after each processing is completed).

As described above, according to the present invention, the user information is not held in the mobile station apparatus in advance. The user information is deleted after the processing that requires the user information is completed. In summary, the user information is not held in the mobile station apparatus except when necessary. Thus, it is possible to minimize the risk of user information being leaked in the event that a mobile station apparatus is lost or stolen.

Hereinafter, exemplary embodiments of the present invention will be described with reference to the drawings. Since the exemplary embodiments described below are preferred exemplary embodiments of the present invention, various limitations that are technically preferable are added. However, the scope of the present invention is not limited to these aspects unless there is a description to limit the present invention in the following description.

First Exemplary Embodiment

Figure 2:
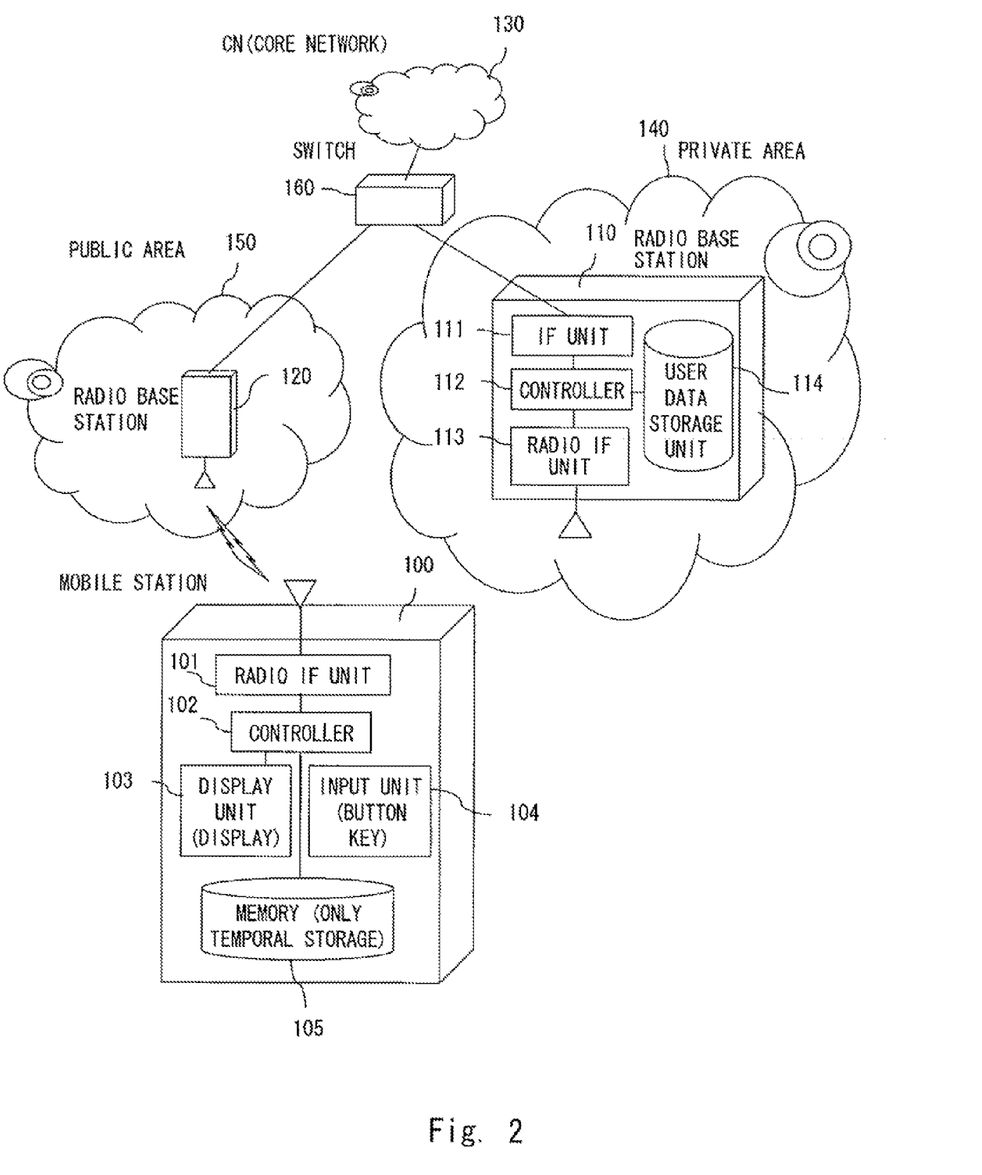
FIG. 2 is a diagram showing a functional block of each apparatus and a network configuration including the mobile communication system according to the exemplary embodiment of the present invention.

FIG. 2 is a diagram showing a network configuration including a mobile communication system according to a first exemplary embodiment of the present invention. FIG. 2 also shows functional blocks of radio base stations and a mobile station forming the mobile communication system. The mobile communication system according to the first exemplary embodiment includes a mobile station 100, and radio base stations 110 and 120. In the mobile communication system according to the first exemplary embodiment, a private area 140 where the radio base station 110 is provided, a public area 150 where the radio base station 120 is provided, and a CN (core network) 130 are connected through a switch 160.

The mobile station 100 includes a radio IF unit 101, a controller 102, a display unit 103, an input unit 104, and a memory 105. The controller 102 has a function of analyzing control signals sent between the radio base stations 110 and 120, and the CN 130 to transmit/receive the control signals, and a function of instructing the memory 105 to hold or cancel the user information. The memory 105 is a storage means for temporarily storing the user information. That is, the memory 105 does not hold the user information except when necessary. The memory 105 has a function of temporarily holding the user information according to the instruction sent by the controller 102 when necessary in such cases as a case in which it executes Attach, a case in which it refers to a phone book to perform an outgoing call, or a case in which it refers to Bookmark to perform a web connection, and a function of deleting the user information according to the instruction sent by the controller 102 when the user information becomes unnecessary, for example, after Detach processing is performed or after a telephone call is ended.

Further, the radio IF unit 101 has a function of performing radio communication with the radio base station 120. The display unit 103 corresponds to a display. The input unit 104 corresponds to input functions including a button key or a biometric authentication. The functions of the radio IF unit 101, the display unit 103, and the input unit 104 are similar to those of the existing systems.

The radio base station 110 includes an IF unit 111, a controller 112, a radio IF unit 113, and a user data storage unit 114. The controller 112 has a function of analyzing control signals transmitted between the mobile station 100 and the CN 130 to transmit/receive the signals, and a function of instructing the user data storage unit 114 to update and read the user information. The user data storage unit 114 has a function of holding and updating the user data corresponding to a plurality of mobile stations according to the instruction sent by the controller 112. Since the radio base station 110 holds the user data, it is desirable that the radio base station 110 is provided in the private area 140 including an office, an eating place, and a house.

Further, the radio IF unit 113 has a function of performing radio communication with the mobile station 100. The IF unit 111 has a function of performing communication with the CN 130 or the radio base station 120. The functions of the radio IF unit 113 and the IF unit 111 are similar to those of the existing systems.

Described above is the detailed configuration of each apparatus (mobile station, radio base station) of the mobile communication system according to the first exemplary embodiment. However, the specific configurations of the radio base station 120, the CN 130, and the switch 160 provided in the public area 150 are not described since they are well known to a person skilled in the art and have no direct connection with the present invention.

Next, an operation of each apparatus (the mobile station 100 and the radio base station 110 in FIG. 2) according to the first exemplary embodiment will be described with reference to sequence charts shown in FIGS. 3 to 5.

Figure 3:
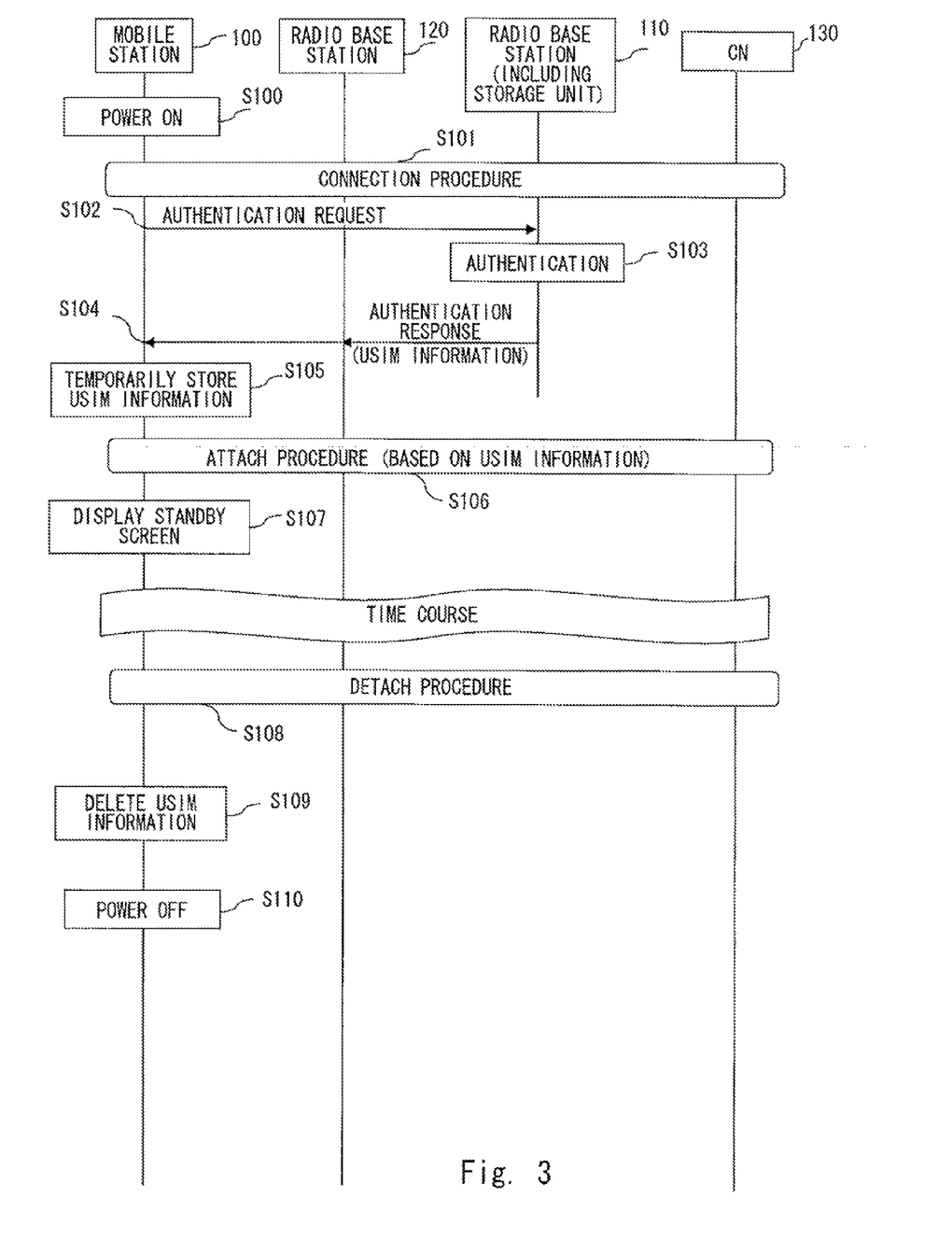
FIG. 3 is a sequence chart showing an operation of each apparatus (when Attach and Detach are executed) according to the exemplary embodiment of the present invention.

FIG. 3 shows a sequence chart when Attach and Detach are executed. In 3GPP (3rd Generation Partnership Project), the processing corresponding to location registration executed when the power supply of the mobile station is turned on is called Attach. Further, in 3GPP, the processing executed when the power supply is turned off is called Detach. In short, as described above, "Attach" is the processing to register the location of the mobile station to a network, and "Detach" is the processing to cancel the location registration to the network. When "Detach" is performed, the location registration of the mobile station to the network is cancelled, and the network does not know where the mobile station is located.

In FIG. 3, after the power supply is turned on (S100), the mobile station 100 executes connection procedure with the radio base station 110 that stores the user information of the mobile station 100 (S101). Then, the mobile station 100 sends an authentication request to the radio base station 110 (S102). Upon receiving the authentication request, the radio base station 110 performs authentication of the mobile station 100 (S103), and then transmits an authentication response with USIM information to the mobile station 100 (S104). At this time, the authentication (S103) executed by the radio, base station 110 may be performed either by a user ID and a password or by biometric authentication. Next, upon receiving the USIM information, the mobile station 100 temporarily stores the USIM information in the memory 105 (S105).

Next, the mobile station 100 performs Attach procedure using the USIM information that is stored (S106), and displays the screen of a standby state (S107). When the power supply is turned off, the mobile station 100 performs Detach procedure (S108), and deletes USIM information (S109) to turn OFF the power supply (S110).

Figure 4:
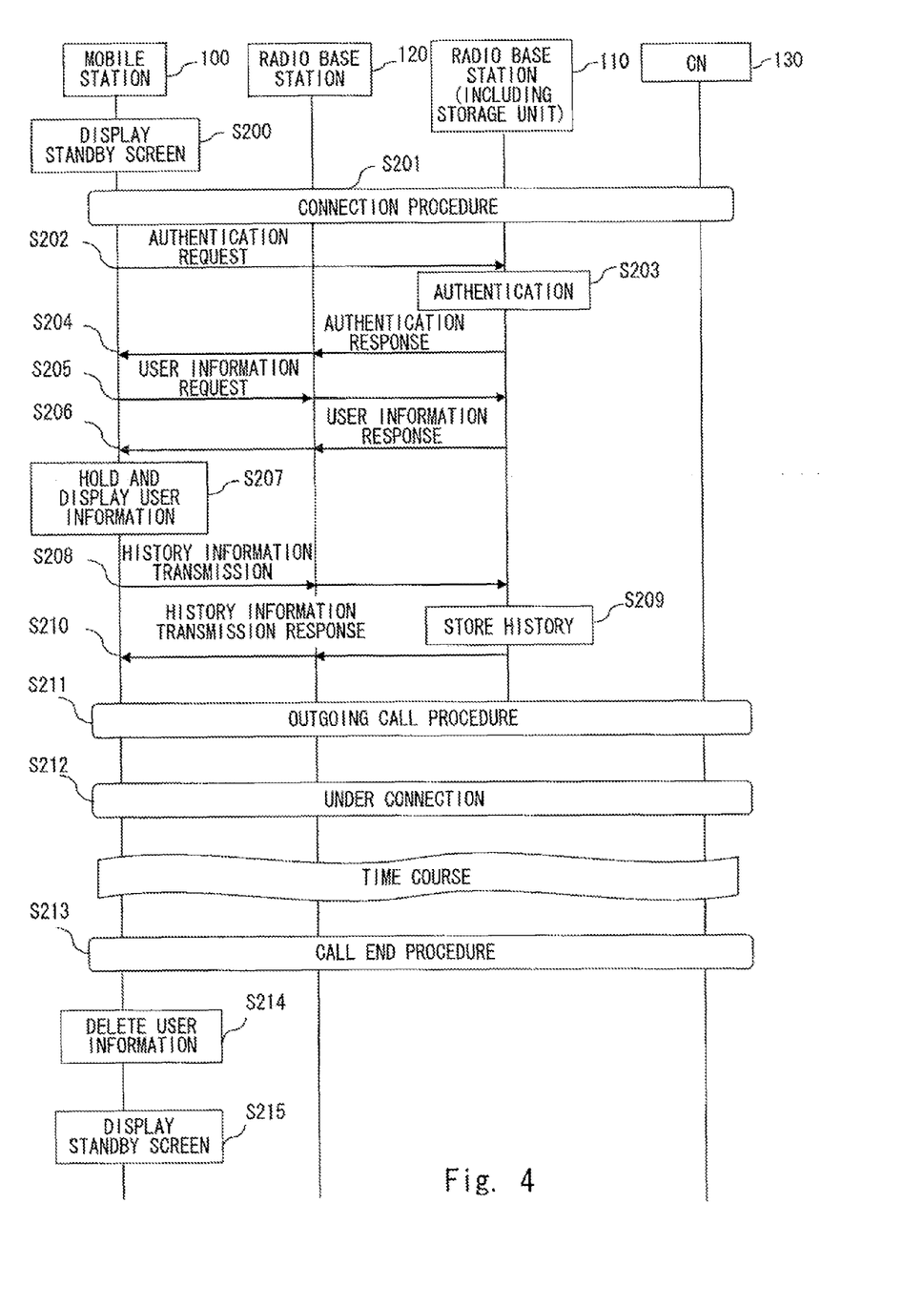
FIG. 4 is a sequence chart showing an operation of each apparatus (when a phone book out going call or a web connection is executed) according to the exemplary embodiment of the present invention.

FIG. 4 shows a sequence chart when an outgoing call is performed after referring to a phone book and a telephone call is ended, or when BookMark is referred to perform a web connection and then the connection is disconnected. In FIG. 4, the mobile station 100 executes connection procedure with the radio base station 110 that stores the user information of the mobile station 100 (S201) from the state in which the standby screen is displayed (S200). The mobile station 100 then transmits an authentication request to the radio base station 110 (S202). The radio base station 110 performs the authentication (S203) of the mobile station 100, and transmits an authentication response to the mobile station 100 (S204). Subsequently, the mobile station 100 transmits a user information request (S205), and the radio base station 110 transmits a user information response with information including a phone book, Bookmark or the like (S206). The mobile station 100 then temporarily stores the information of Bookmark and the telephone book received from the radio base station 110 in the memory 105, to display the information that is acquired (S207).

Next, the mobile station 100 transmits the history information including the number of the outgoing call destination or the web address (S208) before executing the outgoing call procedure. When receiving the history information from the mobile station 100, the radio base station 110 stores the history information in the user data storage unit 114 (S209).

Then, after receiving a history information transmission response from the radio base station 110 that stores the history information (S210), the mobile station 100 executes the outgoing call procedure (outgoing call to a number in a phone book, or a connection to a web address) (S211), and is in a state of under connection (telephone call or web connection) (S212). After that, when terminating the telephone call or the web connection, the mobile station 100 executes a call end procedure (disconnection of the telephone call or the web connection) (S213). Then, the mobile station 100 deletes information of the phone book or Bookmark that is temporarily stored (S214), to display the screen of standby state (S215).

Although FIG. 4 describes operation examples of the outgoing call and the web connection, the operation of FIG. 4 can be applied to all the operations of referring to and specifying the user data to transmit the user data to the mobile communications infrastructure, including the operation of specifying a destination, creating mail, and transmitting the mail.

Figure 5:
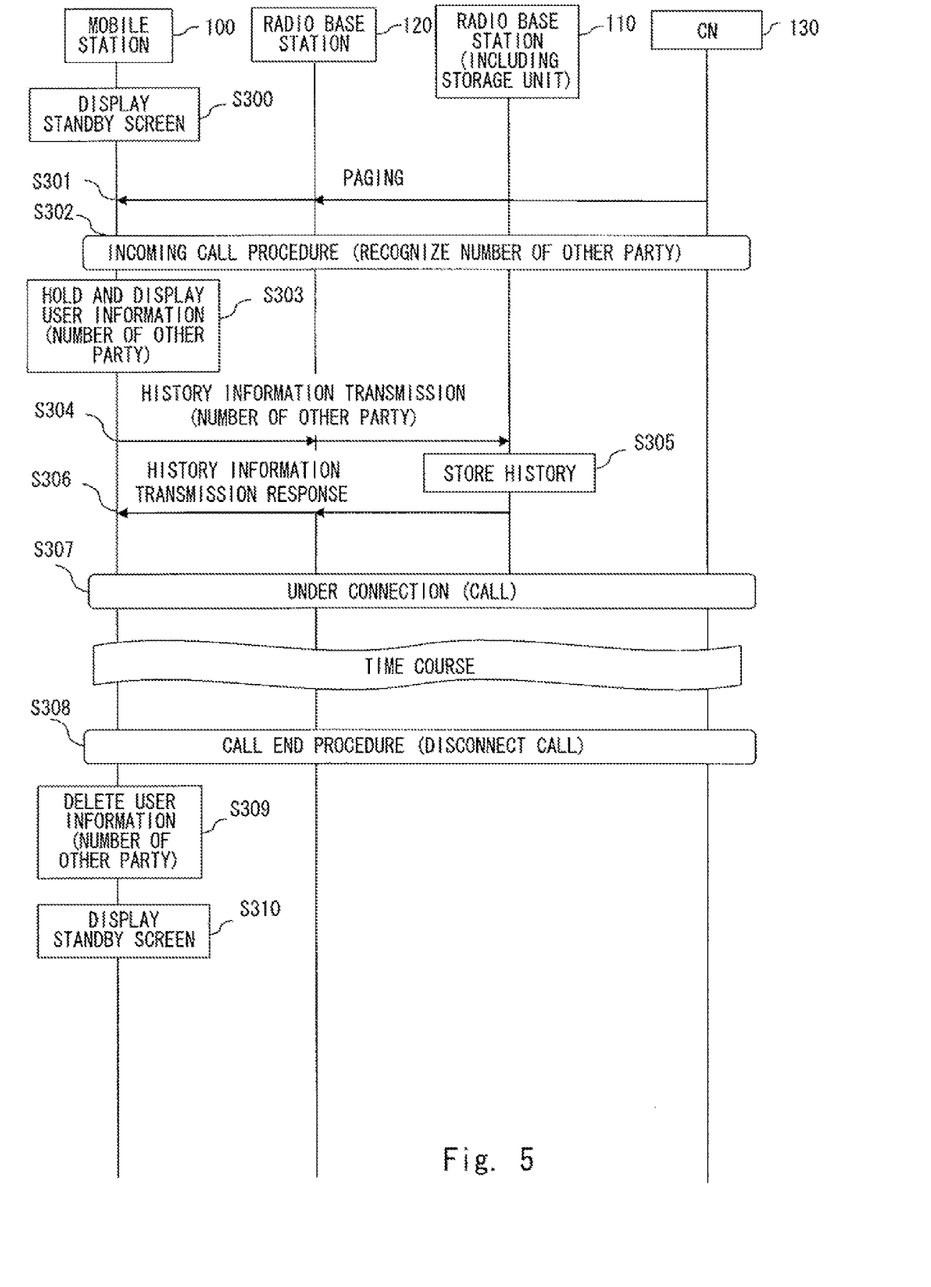
FIG. 5 is a sequence chart showing an operation of each apparatus (when an incoming call is executed) according to the exemplary embodiment of the present invention.

FIG. 5 shows a sequence chart when an incoming call is performed and the telephone call is ended. In FIG. 5, the mobile station 100 receives Paging (S301) from the state in which the standby screen is displayed (S300), executes an incoming call procedure, and recognizes the number of the other party (S302). The mobile station 100 then temporarily stores and displays the number of the other party (S303).

Next, the mobile station 100 transmits the history information transmission including the number of the other party who made a phone call to the radio base station 110 (S304). The radio base station 110 stores the history information including the call receiver number received from the mobile station 100 in the user data storage unit 114 (S305). Subsequently, the mobile station 100 receives a history information transmission response from the radio base station 110 (S306), and then is in a state of being connected (S307). When the mobile station 100 ends the call, the mobile station 100 executes the call end procedure (S308). Then, the mobile station 100 deletes the number of the other party that is temporarily stored (S309), to display the screen of the standby state (S310).

A first effect of the first exemplary embodiment is that the user information held in the mobile station in the existing mobile communication system is not held in the mobile station, but is held in the mobile communications infrastructure. Then, the mobile station acquires the user information when the user data is needed, including a case in which Attach or an outgoing call is performed, and deletes the user information when Detach is performed or a telephone call is ended. Accordingly, it is possible to prevent leakage of the user information without losing the user information in the event that the mobile station is lost or stolen.

Further, a second effect of the first exemplary embodiment is that, since the mobile station does not hold the user information except when necessary, the storage capacity in the mobile station can be reduced, and the mobile station can be provided with reduced cost.

Furthermore, a third effect of the first exemplary embodiment is that, when accessing the user information held in the mobile communications infrastructure, the authentication is performed either by the user ID and the password or by the biometric authentication without fixing the mobile station, which enables an access to the user information by mobile stations of other parties, rented mobile stations, or mobile stations of other carriers.

Furthermore, a fourth effect of the first exemplary embodiment is that, since the operation history is transmitted from the mobile station to the mobile communications infrastructure when an outgoing call or an incoming call is performed, the operation history including the incoming call history and the outgoing call history of the mobile station can be updated in real time.

Furthermore, a fifth effect of the first exemplary embodiment is that, since the user information (subscriber information, telephone book information, history information, and the like) of a plurality of mobile stations are stored in the radio base station, this allows a company to manage the user information or the operation history of the mobile stations which are provided to employees by providing and managing the radio base station that stores the user information in a company.

Second Exemplary Embodiment

Figure 6:
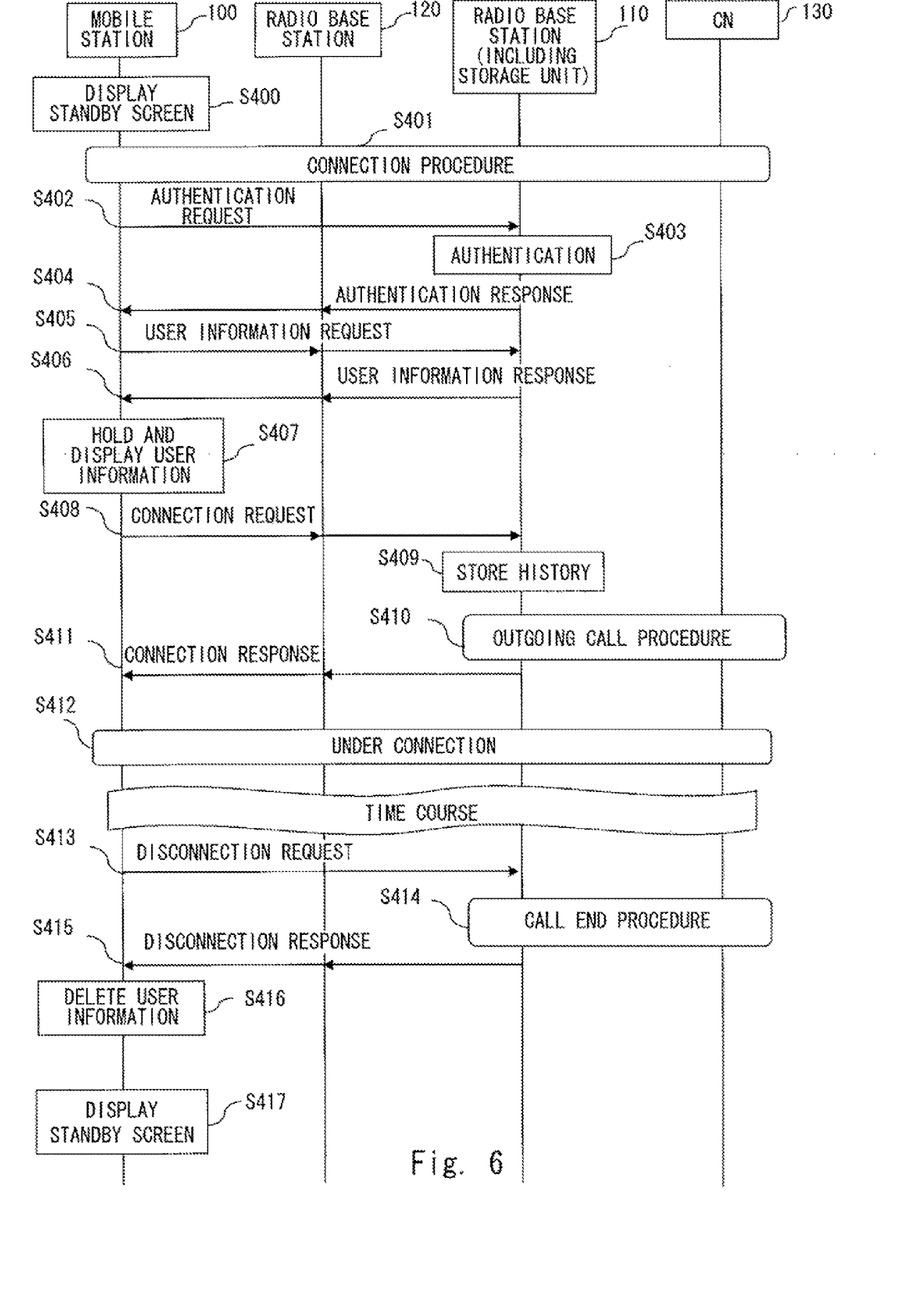
FIG. 6 is a sequence chart showing an operation of each apparatus (when a phone book out going call or a web connection is executed) according to the exemplary embodiment of the present invention.

In a second exemplary embodiment of the present invention, its basic configuration is similar to that of the first exemplary embodiment. The second exemplary embodiment is configured to perform an outgoing call procedure or a call end procedure between the base station and the CN. FIG. 6 shows a sequence chart of the second exemplary embodiment.

In FIG. 6, the mobile station 100 operates in the similar way as that of FIG. 4 from the process of displaying the standby screen (S400) to the process of temporarily storing the user information (phone book or Bookmark) in the memory 105 (S407). Thus, the description of the processing from steps S400 to S407 is omitted. In the second exemplary embodiment, the mobile station 100 transmits a connection request (S408) such as an outgoing call to a number in the phone book or a connection to a web address to the radio base station 110. Then, the radio base station 110 stores the history information such as the outgoing call number or the like in the user data storage unit 114 (S409), executes an outgoing call procedure (outgoing call or Web connection) with the CN 130 (S410), to transmit a connection response to the mobile station 100 (S411).

After that, the mobile station 100 is in connection with the CN 130 through the radio base stations 120 and 110 (telephone call or Web connection) (S412). Further, when the call is ended, the mobile station 100 transmits a disconnection request to the radio base station 110 (S413). The radio base station 110 completes the call end procedure (disconnection of telephone call or Web connection) with the CN 130 (S414), to transmit the disconnection response to the mobile station 100 (S415). Receiving the disconnection response, the mobile station 100 deletes the user information that is temporarily stored (S416), and displays the standby screen (S417).

In the second exemplary embodiment, the outgoing call procedure and the call end procedure of the mobile station 100 are executed between the radio base station 110 and the CN 130, and these procedures are only completed by processing between the two parties, which facilitates faster establishment of the telephone call state or the web connection state.

Third Exemplary Embodiment

Figure 7:
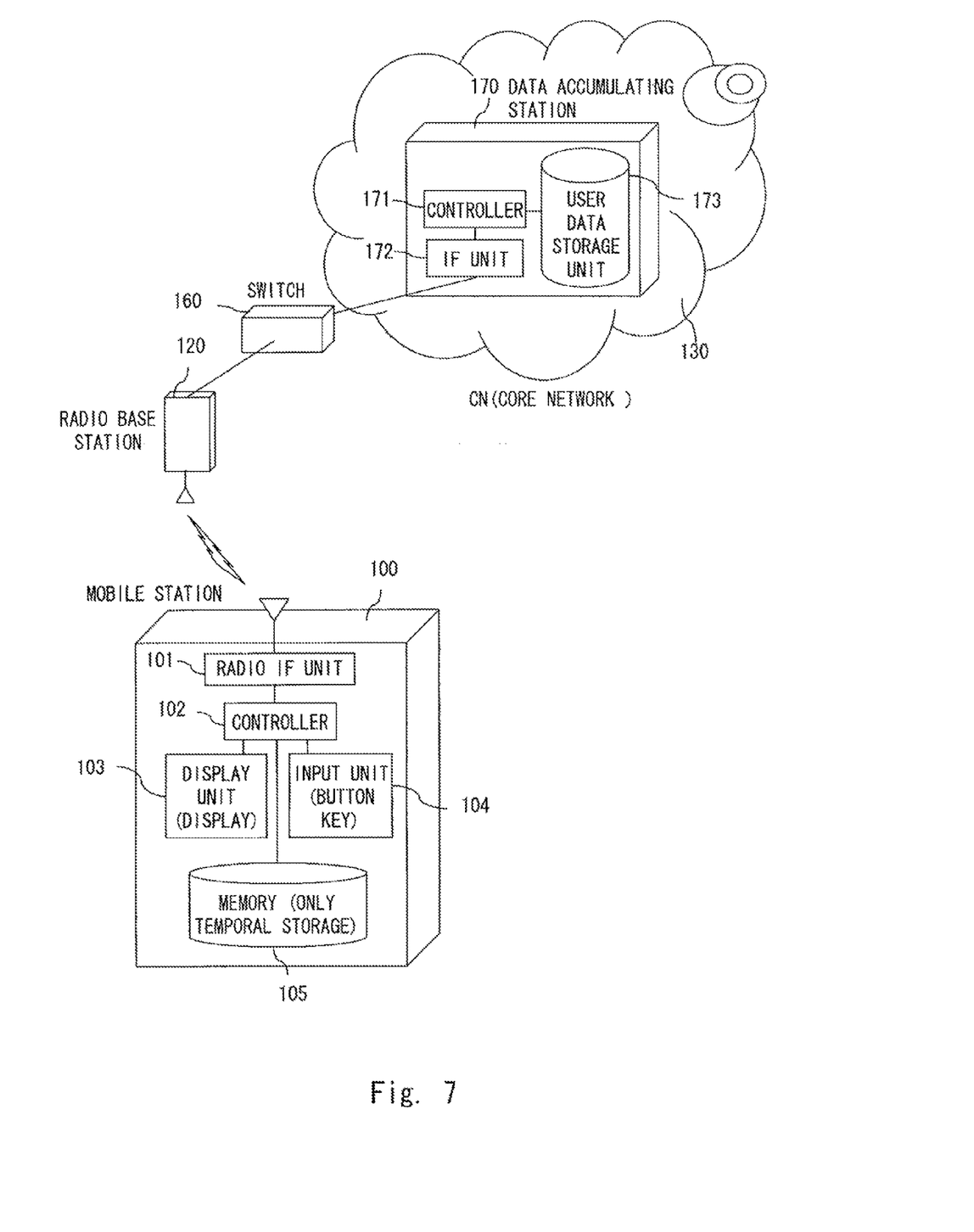
FIG. 7 is a diagram showing a functional block of each apparatus and a network configuration including the mobile communication system according to the exemplary embodiment of the present invention.

FIG. 7 shows a configuration including a function of storing user data in a CN as a third exemplary embodiment of the present invention.

The configuration of the mobile station 100 in FIG. 7 is similar to that in FIG. 2, except that the mobile station 100 in FIG. 7 has a function of storing the user data in a data accumulating station 170 in the CN 130. The data accumulating station 170 includes a controller 171, an IF unit 172, and a user data storage unit 173. The controller 171 has a function of analyzing control signals sent between the mobile station 100 and another device in the CN 130 to transmit/receive the control signals, and a function of instructing the user data storage unit 173 to read or update the user information. The user data storage unit 173 has a function of holding and updating the user data according to the instruction sent by the controller 171. The IF unit 172 has a function of performing communication with another device in the CN 130 and with the radio base station 120. Note that the operations in the configurations shown in FIG. 7 are similar to those shown in the sequence charts shown in FIGS. 3 to 5, and 6.

In the third exemplary embodiment, the CN 130 is configured to provide and manage the data accumulating station 170 that stores the user information of each mobile station, which gives an effect that the mobile communications carriers are able to easily manage the operation history and the user data of the mobile station.

Note that the exemplary embodiments described above are preferred exemplary embodiments of the present invention. The scope of the present invention is not limited to the exemplary embodiments described above. The present invention may be variously changed without departing from the spirit of the present invention.

Specifically, a program executed in the mobile communication system according to the exemplary embodiments has a module configuration including each part described above (mobile station controller, base station controller), and realizes the specific means using actual hardware. In summary, each means is loaded onto a main memory by a computer (CPU) reading out and executing a program from a predetermined storage medium, and a mobile station controller and a base station controller are generated on the main memory.

Alternatively, a program executed on a computer in a base station apparatus according to the third exemplary embodiment has a module configuration including:

receiving a request to acquire the user information from a mobile station apparatus connected by radio, the user information including subscriber information used for location registration processing of the mobile station apparatus, access information used for an access to another mobile station apparatus or to a network, and history information indicating history of the access; and transmitting the user information to the mobile station apparatus according to the acquisition request. The base station apparatus executing the program at least includes a holding means that holds the user information.

Further, a program executed on a computer in a mobile station apparatus according to the third exemplary embodiment has a module configuration including:

sending a request to acquire the user information, after a power supply is turned on, to the base station apparatus that includes a holding means holding user information including subscriber information used for location registration processing, access information used for an access to another apparatus or to a network, and history information indicating history of the access; and temporarily storing the user information acquired from the base station apparatus.

Then, the mobile station apparatus executing the program at least connects with the base station apparatus by radio, and does not hold the user information in advance.

Furthermore, a program executed on a computer in a mobile station apparatus according to the third exemplary embodiment may include:

transmitting the history information to the base station apparatus when the mobile station apparatus accesses the another mobile station apparatus or the network; and receiving, from the base station apparatus that receives the history information, a response that the user information stored in the holding means is updated using the history information.

The program executed on the mobile communication system according to the third exemplary embodiment may be configured to be stored on a computer connected to a network such as the Internet, and provided by being downloaded through the network. Further, the program may be configured to be provided or distributed through the network such as the Internet.

Further, the above-described program may be configured to be provided by being stored on a computer-readable storage medium including floppy (registered trademark) disks, hard disks, magnetic disks, optical disks, magneto-optical disks, CD-ROM (Compact Disc Read Only Memory), CD-R (Compact Disc Recordable), DVD (Digital Versatile Disc), BD (Blu-ray (registered trademark) Disc), ROM (Read Only Memory) cartridges, RAM (Random Access Memory) memory cartridges with battery backup function, flash memory cartridges, and non-volatile memory cards by a file with an installable format or executable format. Furthermore, the above-described program may be configured to be provided by being embedded in a ROM or the like in advance.

In this case, a program code itself that is read out from the storage medium or loaded and executed by a communication line achieves the functions of the exemplary embodiments described above. Then a storage medium that stores the program code forms the present invention.

While the present invention has been described with reference to the exemplary embodiments, the present invention is not limited by the exemplary embodiments described above. The configurations and the details of the present invention may be variously changed in such a way that can be understood by a person skilled in the art within the scope of the present invention.

REFERENCE SIGNS LIST

1 MOBILE COMMUNICATION SYSTEM
2 BASE STATION APPARATUS
3 HOLDING UNIT
4 BASE STATION CONTROLLER
5 MOBILE STATION APPARATUS
6 MOBILE STATION CONTROLLER
100 MOBILE STATION
101, 113 RADIO IF UNIT
102, 112, 171 CONTROLLER
103 DISPLAY UNIT
104 INPUT UNIT
105 MEMORY
110, 120 RADIO BASE STATION
111, 172 IF UNIT
114, 173 USER DATA STORAGE UNIT
130 CN (CORE NETWORK)
140 PRIVATE AREA
150 PUBLIC AREA
160 SWITCH
170 DATA ACCUMULATING STATION

The invention claimed is:

1. A mobile communication system comprising:
a base station apparatus comprising:
a holding unit for holding user information including subscriber information used for location registration processing of a mobile station apparatus connected by radio, access information used for an access to another mobile station apparatus or to a network, and history information indicating history of the access; and
a base station controller for transmitting and receiving the user information to and from the mobile station apparatus and managing the user information held in the holding unit; and
a mobile station apparatus that comprises a mobile station controller for transmitting and receiving the user information to and from the base station apparatus and managing the user information acquired from the base station apparatus,
wherein the mobile station apparatus does not hold the user information of the mobile station apparatus in advance, but acquires the user information, after a power supply of the mobile station apparatus is turned on, from the base station apparatus through the mobile station controller and temporarily stores the user information.

2. A mobile station apparatus comprising:
a mobile station controller for transmitting and receiving user information to and from a base station apparatus and managing the user information acquired from the base station apparatus, the base station apparatus comprising a holding unit and a base station controller, the holding unit holding the user information including subscriber information used for location registration processing, access information used for an access to another apparatus or a network, and history information indicating history of the access, the base station controller transmitting and receiving the user information and managing the user information that is held in the holding unit,
wherein the mobile station apparatus does not hold the user information but acquires the user information, after a power supply is turned on, from the base station apparatus through the mobile station controller and temporarily stores the user information.

3. The mobile station apparatus according to claim 2, wherein the mobile station controller transmits the history information to the base station apparatus when accessing the another mobile station apparatus or the network.

4. The mobile station apparatus according to claim 2, wherein the mobile station controller deletes the user information that is temporarily stored before the power supply of the mobile station apparatus is turned off.

5. The mobile station apparatus according to claim 2, wherein the mobile station controller sends an authentication request to the base station apparatus before performing the location registration processing of the mobile station apparatus, receives and temporarily stores the subscriber information authenticated and transmitted by the base station apparatus, and deletes the subscriber information that is temporarily stored after performing processing to cancel the location registration of the mobile station apparatus.

6. The mobile station apparatus according to claim 2, wherein the mobile station controller sends a request to acquire the access information to the base station apparatus before accessing the another mobile station apparatus or the network, receives the access information from the base station apparatus to temporarily store the access information, transmits the history information to the base station apparatus as a result of the access using the access information, and deletes the access information that is temporarily stored after performing the access.

7. A base station apparatus comprising:
a holding unit for holding user information including subscriber information used for location registration processing of a mobile station apparatus connected by radio, access information used for an access to another mobile station apparatus or to a network, and history information indicating history of the access; and a base station controller for transmitting and receiving the user information to and from the base station apparatus, transmitting and receiving the user information to and from the mobile station apparatus that manages the user information acquired from the base station apparatus, and managing the user information held in the holding unit, wherein the base station controller transmits the user information to the mobile station apparatus after a power supply of the mobile station apparatus that does not hold the user information in advance is turned on.

8. The base station apparatus according to claim 7, wherein the base station-controller receives the history information from the mobile station apparatus, and updates the user information stored in the holding unit using the history information.

9. The base station apparatus according to claim 7, wherein the base station controller comprises an authentication unit for authenticating a user of the mobile station apparatus, performing user authentication by the authentication unit according to an authentication request sent from the mobile station apparatus, and transmitting the subscriber information to the mobile station apparatus.

10. The base station apparatus according to claim 7, wherein the base station controller transmits the access information to the mobile station apparatus according to a request to acquire the access information from the mobile station apparatus, receives the history information from the mobile station apparatus, and updates the user information stored in the holding unit using the history information.

11. A communication control method comprising:

sending a request to acquire user information to a base station apparatus comprising a holding unit for holding the user information, after a power supply of a mobile station apparatus is turned on, in the mobile station apparatus that does not hold the user information in advance, the user information including subscriber information used for location registration processing of itself, access information used to access another apparatus or a network, and history information indicating history of the access, transmitting the user information to the mobile station apparatus according to the acquisition request in the base station apparatus; and acquiring the user information from the base station apparatus in the mobile station apparatus to temporarily store the user information.

12. The communication control method according to claim 11, comprising:

transmitting the history information to the base station apparatus when the access to the another mobile station apparatus or the network is performed in the mobile station apparatus; and receiving the history information from the mobile station apparatus in the base station apparatus, and updating the user information stored in the holding unit using the history information.

13. The communication control method according to claim 11, comprising deleting the user information that is temporarily stored in the mobile station apparatus before the power supply of the mobile station apparatus is turned off.

* * * * *